United States Patent [19]
Pittroff et al.

[11] 4,376,263
[45] Mar. 8, 1983

[54] BATTERY CHARGING CIRCUIT

[75] Inventors: Kurt Pittroff, Hofheim; Gerhard Lang, Weilrod; Gerhard Schwarz, Altena, all of Fed. Rep. of Germany

[73] Assignee: Braun Aktiengesellschaft, Kronberg, Fed. Rep. of Germany

[21] Appl. No.: 228,867

[22] Filed: Jan. 27, 1981

[30] Foreign Application Priority Data

Nov. 6, 1980 [EP] European Pat. Off. ........... 80106836

[51] Int. Cl.³ .................................................. H02J 7/10
[52] U.S. Cl. ......................................... 320/32; 320/35; 320/60; 363/19; 363/97
[58] Field of Search ................... 320/9, 10, 22, 31–33, 320/39, 40, 43, 49, 53, 57, 59, 60, 35; 331/112; 363/18–21, 56, 80, 97, 131

[56] References Cited

U.S. PATENT DOCUMENTS

| | | | |
|---|---|---|---|
| 3,435,320 | 3/1969 | Lee et al. | 363/19 |
| 3,702,961 | 11/1972 | Erickson | 363/19 |
| 3,943,423 | 3/1976 | Hoffman | 320/22 |
| 3,963,973 | 6/1976 | Vermolen | 363/20 |
| 3,964,487 | 6/1976 | Judson | 331/112 X |
| 4,001,668 | 1/1977 | Lewis | 323/299 |
| 4,080,646 | 3/1978 | Dietrich | 363/23 |
| 4,081,729 | 3/1978 | Payne et al. | 318/480 |
| 4,128,798 | 12/1978 | Takei | 320/39 X |
| 4,323,961 | 4/1982 | Josephson | 363/56 |

FOREIGN PATENT DOCUMENTS

| | | | |
|---|---|---|---|
| 1588691 | 5/1970 | Fed. Rep. of Germany | 363/18 |
| 2014377 | 10/1970 | Fed. Rep. of Germany | . |
| 2137883 | 2/1973 | Fed. Rep. of Germany | . |
| 2402182 | 8/1974 | Fed. Rep. of Germany | . |
| 2614746 | 10/1977 | Fed. Rep. of Germany | . |

*Primary Examiner*—A. D. Pellinen
*Attorney, Agent, or Firm*—Robert A. Shack

[57] ABSTRACT

A battery charging circuit having an electromagnetic transformer with primary and secondary coils, a rectifier connected between the secondary coil and the battery, a first transistor connected in series with the primary coil and a resistor to form a circuit in parallel with a power source, the base of the first transistor being connected to the secondary coil, and a second transistor electrically connected to the base of the first transistor. The first transistor has a high switching frequency, and the battery is charged with a constant reverse current during its blocking phase, regardless of the power source voltage. The first transistor is protected from reverse kick-back voltage pulses induced during its blocking phase by the provision of a diode and Zener diode connected in series across the primary coil and a capacitor interposed between the secondary coil and the base of the first transistor.

4 Claims, 8 Drawing Figures

BATTERY CHARGING CIRCUIT

BACKGROUND OF THE INVENTION

This invention relates to a circuit for charging a battery of a battery operated appliance. More particularly, this invention is directed toward a circuit for operating and charging a battery of an appliance with a constant effective current from an AC power source which may be of a plurality of line voltages.

With portable electric and electronic devices, it is desirable that they can be operated from different voltages and, if they have storage batteries, that these storage batteries can be charged at different voltages. For example, electric razors, flash units, portable radios, and the like are often taken along on journeys to foreign countries and are then operated at the different line voltages in the respective countries. As a rule, these line voltages vary on the one hand between 110 volts and 240 volts and on the other hand between 50 Hz and 60 Hz.

Numerous circuit arrangements have already been proposed for matching the small electric appliances to various line voltages. For example, a circuit arrangement is known for the capacitive transformation of an input voltage. By means of this arrangement, it is possible to operate a small electrical appliance at various D.C. and A.C. currents within a prescribed range (DE-OS 26 14 746). However, with this circuit arrangement, there is no means which is especially intended for charging a storage battery or a nickel-cadmium battery.

A circuit arrangement is also known by means of which an electric razor can be operated over a wide range of different input A.C. voltages (U.S. Pat. No. 4,001,668). With this circuit, a capacitor is charged through transistors, in pulse-fashion, to a particular voltage, by means of which a motor or the like is driven. Special means for charging a storage battery are likewise not provided by this circuit arrangement.

A circuit, in which a capacitor is charged up to a prescribed value, is also known from U.S. Pat. No. 4,080,646. Here, a chopper circuit is provided, which is shut off when the prescribed capacitor voltage is reached. A special charging circuit for storage batteries or for nickel-cadmium cells, however, is not contained in this circuit arrangement.

Special charging circuits for rechargeable batteries or the like have already also been proposed. With a known charging circuit, a thyristor is provided which passes or blocks the charge current depending on the voltage existing at the battery (U.S. Pat. No. 4,081,729). This charging circuit, however, is not suitable for different input line voltages.

Other charging circuits have been proposed for charging nickel-cadmium cells and for use with electric razors. They contain a high-frequency oscillator which is connected to the line voltage, and which is dependent on the charge state of the nickel cadmium cells (U.S. Pat. No. 4,128,798, DE-OS No. 24 02 182). These charging circuits likewise cannot be used with various line voltages.

A battery charging unit, which can be used with various input A.C. line voltages, has been proposed (U.S. Pat. No. 3,943,423). This charging unit contains a controllable transistor and a current amplifier. Only negative feedback is provided which couples the output of the current amplifier back to the control electrode of the transistor. In this way, a higher charging current flows when the input voltages are lower.

A constant-current charging unit for various line voltages is also known. This circuit is intended for the continuous charging of nickel-cadmium mini-storage batteries, and includes a transformer (DE-AS No. 21 37 883). With this charging unit, the transformer is designed as a current transformer. The primary coil of the transformer contacts the line through a capacitor, while the secondary coil of the transformer feeds through a rectifier to the battery being charged.

Finally, a transistor-transformer circuit is also known, by means of which it is possible to transform an A.C. line voltage either into a low D.C. current for charging a battery or into a high D.C. current for directly driving a D.C. motor (DE-OS No. 20 14 377). With this transformer circuit, a high-frequency oscillator with a saturable core is provided. This circuit contains two mutually coupled coils, one of which is in series with a switching transistor.

SUMMARY OF THE INVENTION

It is an object of this invention to provide a circuit by means of which a battery, e.g. a nickel-cadmium cell, can be charged with a constant effective current, whereby the input voltage may fluctuate.

It is also an advantage of this invention to provide a circuit in which, by a simple switching operation, an electrical device, e.g. an electric razor, can be operated either from the line or independent of the line. Furthermore, the charge current for the battery can be adjusted and switched in the range of about 1:10. In a preferred embodiment, the function of the circuit arrangement can be indicated by a lamp or by a light-emitting diode with approximately constant brightness. Furthermore, the components necessary to implement the circuit arrangement represent a minimal expenditure, because existing elements are in part used for multiple purposes.

Finally, the circuit can be expanded easily for rapidly charging the cells of a nickel-cadmium storage battery with automatic shut-off, whereby the shut-off takes place depending on the storage battery voltage and on the heating of the storage battery.

BRIEF DESCRIPTION OF THE DRAWINGS

This invention, both as to its organization and principles of operation together with further objects and advantages thereof, may better be understood by referring to the following detailed description of an embodiment of the invention taken in conjunction with the accompanying drawing in which.

DESCRIPTION OF THE PREFERRED EMBODIMENT

Figure 1:
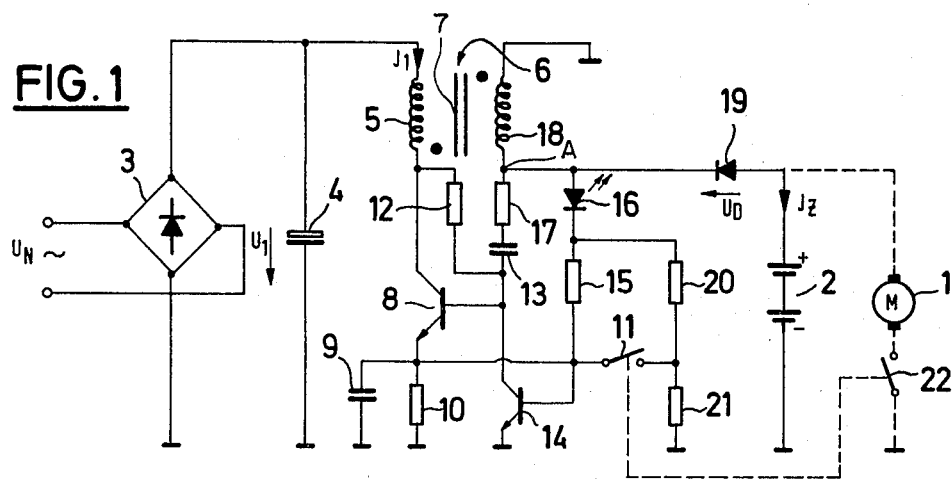
FIG. 1 is a circuit diagram illustrating an electronically controlled transformer as a power supply with a self-oscillating blocking oscillator and/or a through-flow transformer, in accordance with this invention.

Referring now to FIG. 1, a circuit arrangement includes an electric motor 1, which can optionally be powered from a battery 2 or from an A.C. line voltage $U_N$. The A.C. line voltage is applied to a rectifier 3, which is connected in parallel with a charging capacitor 4. A first terminal of the primary coil 5 of a throughflow transformer 6, which has a ferrite core 7, is connected with the charging capacitor 4. A second terminal of the primary coil 5 is connected to the collector of a first transistor 8. The emitter of the transistor 8 is connected to a parallel circuit, consisting of a capacitor 9 and a resistor 10, as well as to a switch 11. The base of transistor 8 is connected, through a resistor 12, to the second terminal of the primary coil 5, to a capacitor 13, and to the collector of a second transistor 14.

Figure 2A:
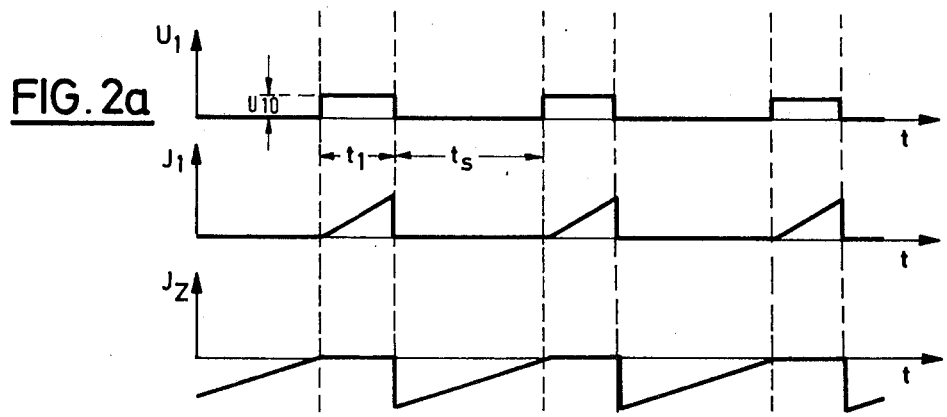
FIGS. 2a and 2b is a diagram illustrating the time response of voltage and current at a coil of the transformer, as a function of the supply voltage, as well as the response of the charge current, in accordance with this invention.
Figure 2B:
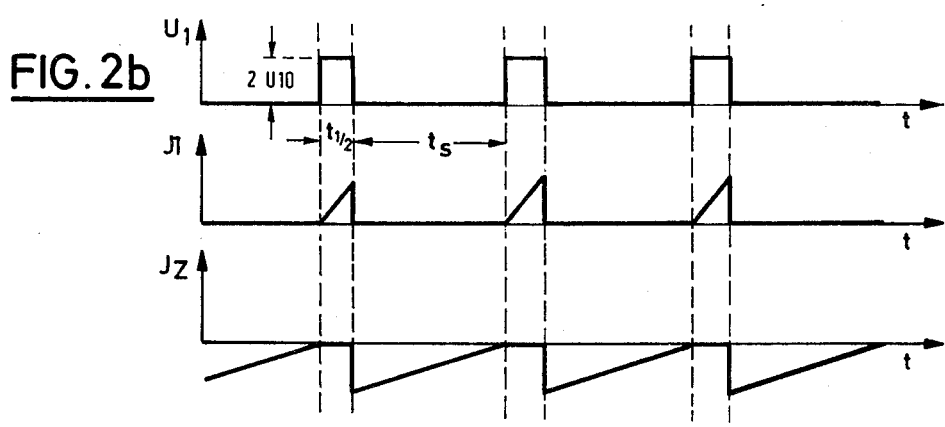
Figure 3:
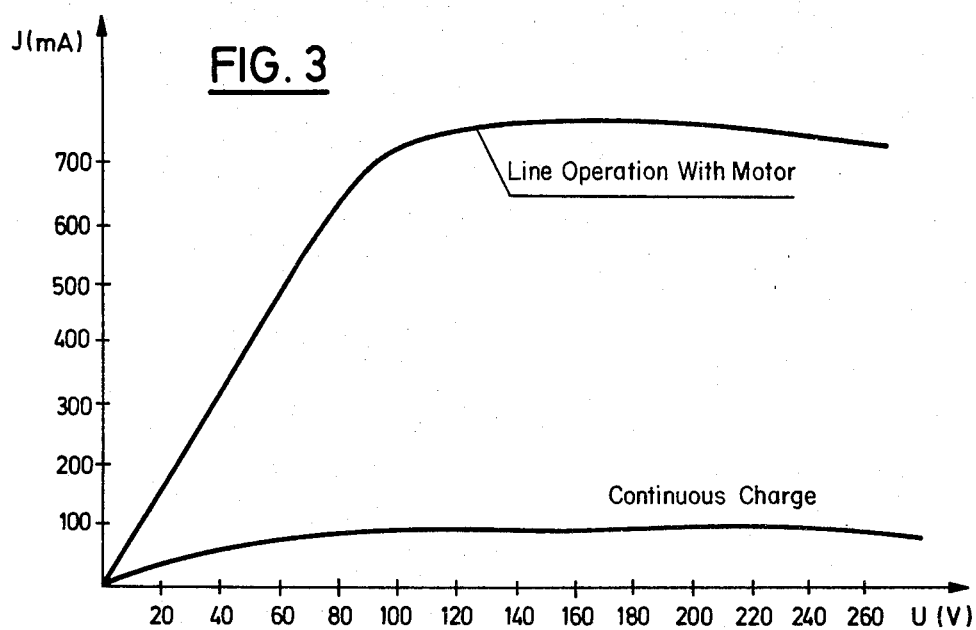
FIG. 3 is a diagram illustrating the response of the output current as a function of the line voltage, in accordance with this invention.

When the emitter of transistor 14 is grounded, its base is connected to the switch 11, and, through a resistor 15, to the cathode of a light-emitting diode 16. The anode of diode 16 is connected to a resistor 17, which in turn is connected to the capacitor 13. The anode of the diode 16 is also connected to a terminal of the secondary coil 18 of the throughflow transformer 6 at point A. The other terminal of transformer 6 is grounded. The anode of the diode 19 is connected to a first terminal of the motor 1 and/or to a negative pole of the battery 2. From the cathode of diode 16, a connection to ground is provided through resistors 20 and 21. The connecting line between the resistors 20 and 21 is connected to the switch 11. Switch 22 is connected to a second terminal of the motor 1 to ground the motor 1 when desired. The mode of operation of the circuit described in FIG. 1 will be explained below. Reference will also be made here to FIGS. 2a, 2b, and 3.

The A.C. line voltage $U_N$ is rectified by the rectifier 3, which can be a Graetz-bridge. It is smoothed through the charging capacitor 4. A voltage is developed at the charging capacitor 4, and this voltage corresponds to the square root of 2 times the value of the r.m.s. A.C. voltage. Starting from an operating condition when the circuit is idling, and the two transistors 8 and 14 are blocking, if one applies a D.C. voltage to the series circuit consisting of the primary coil 5, the transistor 8, and the resistor 10, a current can flow through the resistor 12 to the base of the transistor 8. A few microamperes of base current is sufficient to cause the transistor 8 to have a tendency to conduct. This causes a small current through the primary coil 5 of the throughflow transformer 6, which in turn causes a change of the magnetic flux of the throughflow transformer 6. At point A of the secondary coil 18, a positive electric voltage is induced. This positive voltage is applied to the base of transistor 8, through the resistor 17 and the capacitor 13. Because of this voltage, a base current is generated which is essentially limited by the resistor 17. This type of coil coupling results in a avalanche-type rising switch-on effect in the transistor 8, so that transistor 8 is comparable to a mechanical switch. As the transistor 8 switches on, the current in the primary coil 5 of the throughflow transformer 6 rises, until a voltage proportional to the current, for example approximately 100 millivolts, is applied to the resistor 10. This voltage causes a base current in the transistor 14. In this way, the transistor 14 switches through, and the base of the transistor 8 is forced to ground or null potential. The result of this is that the transistor 8 conducts less well, and the current through the primary coil 5 is reduced. This causes a negative flux change in the ferrite core 7, the consequence of which is to reverse the voltage at point A. The voltage is now negative, and is applied, through the resistor 17 and the capacitor 13, to the base of the transistor 8. This process favors a switch-off process in transistor 8. The rapid switching off of transistor 8 is furthermore supported by the capacitor 9, which maintains the voltage briefly at the emitter of transistor 8. In this way, the base-emitter voltage is negative at the moment that the transistor 8 switches off.

During the blocking phase of the transistor 8, the magnetic energy existing in the ferrite core 7 is dissipated as a current from the secondary coil 18. During this process, the diode 19 becomes conducting, and the battery 2, which, for example, consists of nickel-cadmium batteries, receives a linearly decaying charge current. A negative, decaying current through the resistor 17 and the capacitor 13 keeps transistor 8 blocked until the magnetic energy stored in the core 7 has dissipated. Only then can a starting current again flow through the resistor 12 into the base of the transistor 8 which will trigger the conducting process that has already been described.

A blocking oscillator can be constructed by means of the throughflow transformer 6 and the transistors 8 and 14. The blocking phase of this blocking oscillator depends on the voltage of the cells of the battery 2. Here, this voltage, viewed from the oscillator side, is nearly constant.

The current can flow in these cells only when the relationship $$|N \cdot d\phi/dt + U_D| > |U_{NC}|$$

is fulfilled. Here the symbols have the following meaning:

N = number of windings of the secondary coil 18;
$d\phi/dt$ = time change of the magnetic flux
$U_d$ = voltage drop at the diode 19
$U_{NC}$ = voltage of the battery 2.

If the energy content in the core 7 is always the same at the beginning of each blocking phase, the current flow into the battery 2 will be constant over the time average. However, if the battery 2 is severely discharged, or is sometimes short-circuited, the blocking phase will be correspondingly extended. This results in an automatic current limitation.

The circuit arrangement described above achieves the result that the core 7 always has the same energy content at the switch-off moment. As already described, if the voltage of the battery 2 is constant, this implies an equal blocking duration $t_s$ (FIG. 2a) of the transistor 8, or an equal charge current response $J_Z(t_s)$ per blocking cycle at the battery 2.

The rise of the current $J_1$ in the primary coil 5 is proportional to the magnitude of the applied voltage $U_N$ or $U_1$. Since the transistor 8 switches off depending on its emitter current—and consequently, to a good approximation, depending on the current $J_1$ through the primary coil 5—the circuit necessarily adjusts to changes of the supply voltage $U_1$. The switch-on time $t_1$ of the transistor 8 is accordingly halved if the voltage $U_1$ is doubled. The result is to increase the switching frequency and consequently to increase the effective charge current $J_Z$ of the battery 2. FIG. 2a shows the case where $U_1$ has a first value $U_{10}$, while FIG. 2b shows the case where $U_1$ has twice the value as in FIG. 2a, namely $2U_{10}$. As can be seen from FIGS. 2a, 2b, the switch-on time $t_1$ is here cut in half. The voltage at point A, which is transformed by the throughflow transformer 6, is proportional to the input voltage $U_1$.

As the input voltage rises, the base current is thereby increased at transistor 8. Transistor 14 must then draw a larger current, in order to neutralize the base potential at resistor 8 for the purpose of shutting it off. The consequence is that this effect will also alter the time average of the charge current $J_Z$ with the supply voltage $U_1$. If a thyristor were used instead of the transistor 14, this effect could be reduced, even if it could not be eliminated entirely.

Both properties of the circuit—change of the average charge time by a frequency change, and shift of the current threshold depending on a supply voltage—can be eliminated by measures which will be described in more detail below.

At resistor 10, a current is superposed on the current that flows through the primary coil 5, transistor 8, and resistor 10. The superposed current is directly proportional to the supply voltage U1.

In this way, the switch-off point of transistor 8 is displaced in time through transistor 14 depending on the supply voltage $U_1$. While the current and voltage are rising at resistor 10, point A hs a potential that is proportional to the supply voltage $U_1$. The connection of point A, through the diode 16 and the resistor 15, to the resistor 10 makes it possible to detect the supply voltage $U_1$, with especially low loss. In the resistor 10, there flows a current component that is proportional to the supply voltage and a current component that is proportional to the respective emitter current of transistor 8. The latter current component initiates the switch-off process. If the resistance ratios of resistors 15 and 10 have been appropriately dimensioned, the addition of the two currents in resistor 10 makes it possible to adjust the charge current $J_Z$ at the battery 2 so as to be independent of the supply voltage $U_1$ over a broad range. The magnitude of the current $J_Z$ can be increased, for example, by closing the switch 11, whereby the resistors 20, 21 are coupled in.

The light-emitting diode 16 also loads the resistors 15 and 20 from point A during blocking operation. This diode 16, as well as the addition network consisting of resistors 20, 21, 15, and 10, carry current only during the switch-on phase of transistor 8. Since the switch-on time is approximately inversely proportional to the magnitude of the supply voltage $U_1$, the brightness of the light-emitting diode 16 is automatically regulated.

The embodiment described here can be used to operate a D.C. motor for an electric razor or a similar device. If both switches 11 and 22 are open, the circuit operates in the continuous charge mode. Here, the motor 1 is at rest, and the continuous charge current flows into the battery 2. Furthermore, the light-emitting diode 16 lights up. If the two switches 11 and 22 are closed, the current delivered by the transformer 6 is multiplied approximately by ten, and the motor 1 operates without discharging the battery 2. The battery 2 now acts only as a voltage stabilizer. Also, the light emitting diode 16 lights up. The control characteristic of a practically implemented circuit arrangement is shown in FIG. 3.

A further development of the invention will be described below, which is especially suitable for charging up nickel-cadmium batteries. With the rapidly charging nickel-cadmium cells, there is a risk of overloading since the cells are not isolated from the charge-current source at the proper time (compare, for example, Publication Number GET-3148 AD of General Electric Company: The Nickel-Cadmium Storage Battery). The lifetime of the cells accordingly decreases rapidly. The circuit arrangement described below senses the charge condition of the cells depending on the cell voltage and the cell temperature. When a threshold value is reached, where said threshold value depends on both parameters, the charge current is switched off. Here, the circuit should have hysteresis characteristics in combination with the blocking oscillator described above.

Figure 4:
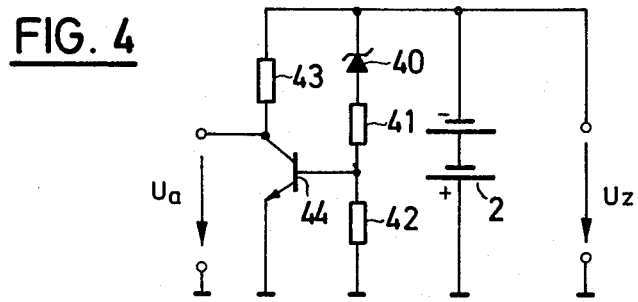
FIG. 4 is a circuit diagram for detecting the charging and heating condition of the nickel-cadmium cells, in accordance with this invention.

FIG. 4 illustrates the principle of this circuit. Here, a Zener diode 40, resistor 41, and resistor 42 are connected in parallel with the nickel-cadmium cells 2. The base of the transistor 44 is connected to the connecting line between the two resistors 41 and 42. The emitter of transistor 44 is grounded, and the collector of transistor 44 is connected to the cathode of the Zener diode 40 through resistor 43. If the Zener voltage $U_Z$ reaches the value fixed by the Zener diode 40, the transistor 44 begins to conduct. The voltage $U_a$ at the collector of transistor 44 thereupon drops.

Figure 5:
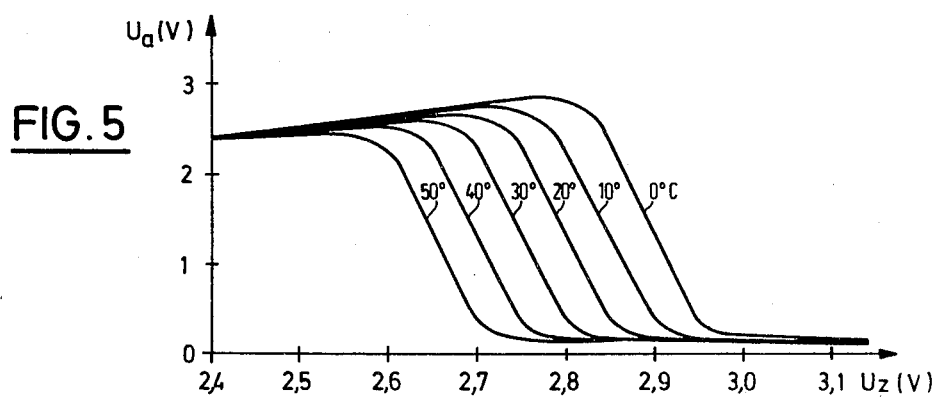
FIG. 5 is a diagram illustrating the measured voltage as a function of cell voltage at various temperatures, in accordance with this invention.

FIG. 5 shows the response of the collector voltage $U_a$ as a function of the cell voltage $U_Z$, for various temperatures. The temperature coefficient of the switch-over voltage is about 5 mV/° C and thereby matches the temperature behavior of two series-connected nickel-cadmium cells 2. In order to sense the temperature of the two cells as directly as possible, the housing of the Zener diode 40 is thermally connected with the two nickel-cadmium cells 2.

Figure 6:
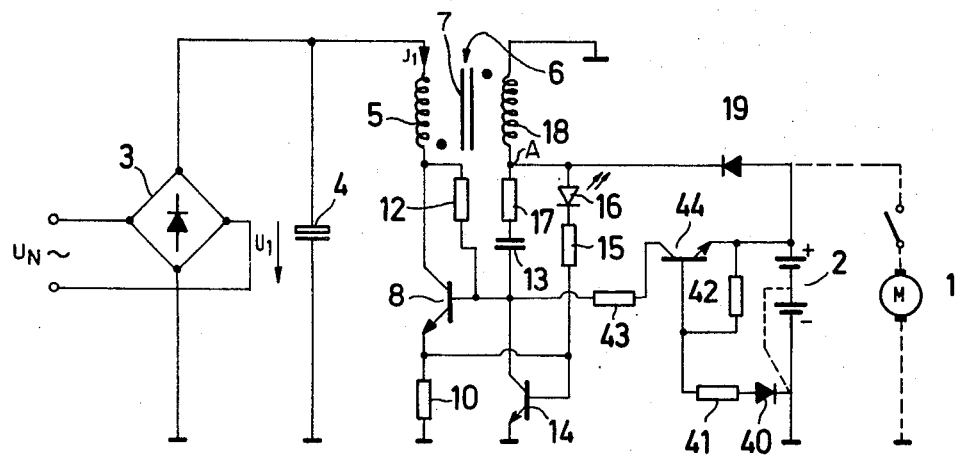
FIG. 6 is a circuit diagram illustrating the combination of the circuits of FIGS. 1 and 4, in accordance with this invention.

In FIG. 6, the circuit of FIG. 4 is inserted into a circuit according to FIG. 1. If the cell voltage is less than the value fixed by the Zener diode 40, no current will flow through the Zener diode 40, and the transistor 44 is blocking. The transformer 6, 8 will oscillate, and the cells 2 are being charged.

Only when the critical cell voltage has been reached, will the current flow through the Zener diode 40 and the resistor 41. This current will divide so as to distribute itself to the base of transistor 44 and to the resistor 43. Because of the base current, the transistor 44 becomes conducting, and a current flows through resistor 43 from the negative electrode of the cells 2 to the base of transistor 8. Eventually, the current through the resistor 43 neutralizes the sum of the base current components of transistor 8, which flow in resistor 12 and especially in resistor 17, during the switch-on phase of transistor 8. As soon as this happens, transistor 8 can no longer conduct. The transformer therefore idles; i.e. a static operation prevails. The base potential of transistor 8 is now set only by the resistors 12 and 43, while the resistor 17 is decoupled by the capacitor 13. Only when the current through the resistor 43 falls below the value limited by resistor 12 can the base potential of transistor 8 rise to a value which makes it possible for the transformer to rise again. Since the current that is actually flowing through the resistor 43, for shutting off the transformer, depends predominantly on resistor 17, and since the current for switching on the transformer depends on resistor 12, a hysteresis behavior will result corresponding to the difference of these currents.

Figure 7:
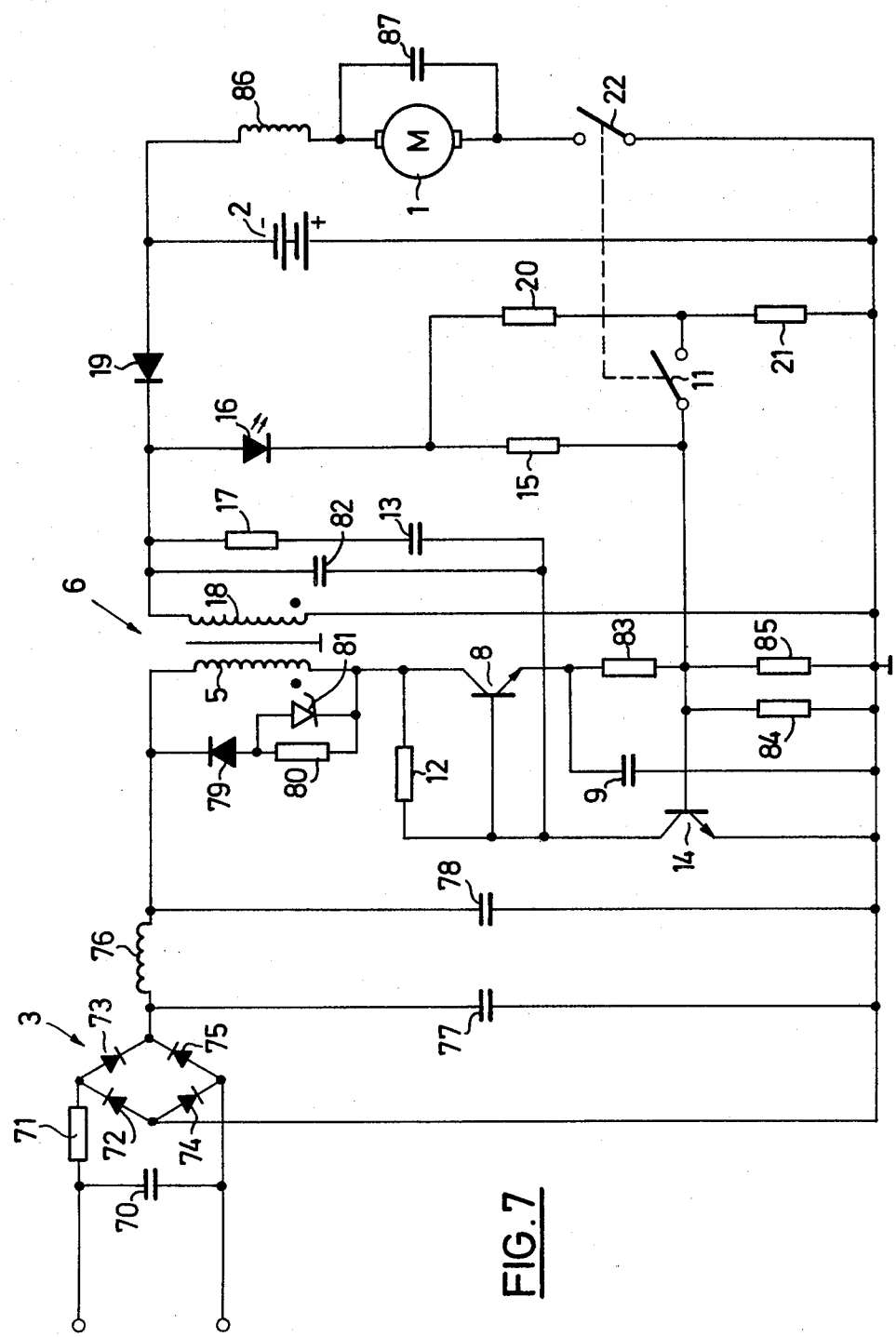
FIG. 7 is a circuit diagram similar to FIG. 1 which includes additional components, in accordance with the invention.

FIG. 7 is a variant of FIG. 1. Those elements which correspond to elements of FIG. 1 are provided with the same reference numbers. The rectifier input circuit 3 comprises diodes 72, 73, 74, and 75. Anti-hum and current-limiting is performed by capacitor 70, resistor 71, capacitor 77, capacitor 78, and inductor 76. These elements are generally known to cooperate with rectifier circuits. Likewise, the capacitor 87 and inductor 88 coupled to the DC motor 1 are well known.

Furthermore, a capacitor 82 is connected in parallel to the series-circuit consisting of the resistor 17 and capacitor 13. The capacitor 82 provides a definite base voltage for the transistor 8.

An essential point in comparison with the arrangement of FIG. 1 is that the emitter of the transistor 8 is grounded through a resistor 83 and through two resistors 84, 85 which are connected in parallel. The series circuit of the resistor 83 and the parallel combination of resistors 84 and 85 lie in parallel with the capacitor 9.

It is also important that an arrangement is provided, in parallel to the primary coil 5 of the transformer 6, which consists of a diode 79 and of a resistor 80, which is connected in series with the diode 79. The resistor 80 is shunted by means of a Zener diode 81. The anode of the Zener diode 81 is connected to the anode of the diode 79. The circuit arrangement, parallel to the primary coil 5, has the purpose of eliminating the peaks of the voltage kick-back pulse, which forms because of stray inductance.

While an embodiment and application of this invention have been shown and described, it will be apparent to those skilled in the art that many more modifications are possible without departing from the inventive concepts herein described. The invention, therefore, is not to be restricted expect as necessary by the prior art and by the spirit of the appended claims.

What is claimed as new and desired to be secured by Letters Patent of the United States is:

1. A circuit for charging a battery of an appliance from a power source having a power source voltage, comprising:

an electromagnetic transformer having a primary coil with first and second terminals and a secondary coil;

rectifying means electrically connected between said secondary coil and said battery;

an electrical series circuit including a first electronic switch having a first control lead, a first resistor and said primary coil, said series circuit being electrically connected in parallel with said power source;

first capacitor means electrically connected between said secondary coil and said first control lead for substantially reducing reverse voltage pulses transmitted to said first control lead;

a second electronic switch having a second control lead, said second electronic switch being electrically connected to said first control lead;

control signal supply means for simultaneously supplying said second control lead with a first electrical control signal proportional to the current flowing through said primary coil and a second electrical control signal proportional to said power source voltage;

a first diode having a first anode and a first cathode, said first diode being electrically connected in parallel with said primary coil with said first cathode being electrically connected to said first terminal of said primary coil; and a Zener diode electrically connected in series with said first diode and in parallel with said primary coil, and having a second anode and a second cathode, said second anode being electrically connected to said first anode and said second cathode being electrically connected to said second terminal of said primary coil.

2. The circuit of claim 1, further comprising a second resistor electrically connected in parallel with said Zener diode.

3. The circuit of claim 1 or 2, further including an electrical DC load, a second capacitor electrically connected in parallel with said DC load and an inductor electrically connected in series with said DC load.

4. The circuit of claim 3, further comprising a third resistor and a fourth resistor electrically connected in parallel between said second control lead and a ground connection, and a fifth resistor electrically connected between said parallel combination of said third and fourth resistors and said first electronic switch.

* * * * *